May 9, 1967   R. S. CHASTAIN   3,318,419
CHOCK ASSEMBLY FOR TANDEM WHEELS
Filed March 8, 1966
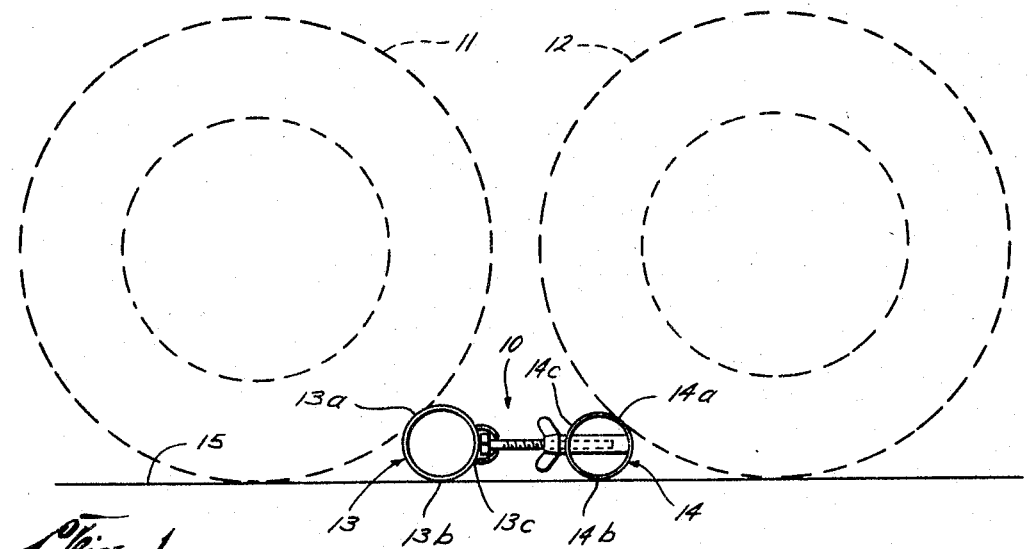
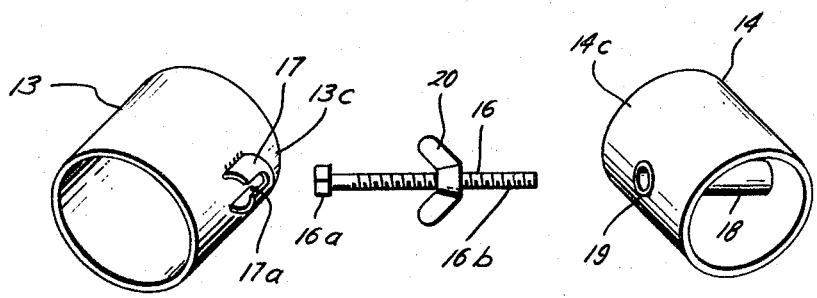
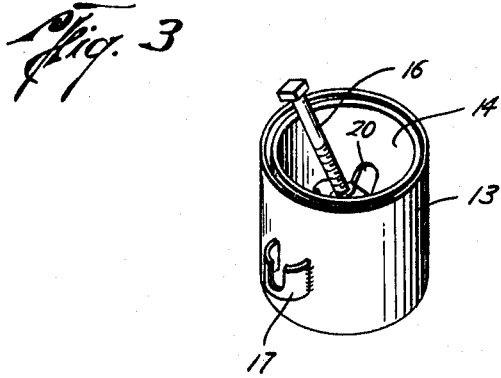
Ray S. Chastain
INVENTOR.
BY
ATTORNEYS

United States Patent Office 3,318,419
Patented May 9, 1967

3,318,419
CHOCK ASSEMBLY FOR TANDEM WHEELS
Ray S. Chastain, P.O. Box 504, Le Fors, Tex. 79054
Filed Mar. 8, 1966, Ser. No. 532,752
5 Claims. (Cl. 188—32)

This invention relation to an improved chock assembly for tandem wheels on a vehicle for holding the wheels from rolling in either direction.

Many types of vehicles are provided with tandex wheels. It is necessary from time to time to scotch such wheels against rolling in either direction with wheel chocks. One type of vehicle where wheel checks are frequently necessary is the travel trailer or mobile home. This is done to hold to a minimum and, if possible prevent any movement of the vehicle's wheels that may occur because of movement inside the trailer by the occupants thereof. For this purpose the wheel chocks should be efficient in resisting rolling of the wheels in either direction. Also, the wheel chocks should be easily removed when it is decided to move on to another location. Further, it is desirable that the wheel chocks be of such size and so constructed that they can be easily stored and carried along with the trailer so as to be readily at hand when the next location is reached.

It is, therefore, an object of this invention to provide a wheel chock assembly for tandem wheels which can be easily installed and removed without tools and which, when in place, will prevent even small rolling movement of such wheels.

It is another object of this invention to provide a wheel chock assembly for tandem wheels that is efficient, easily installed and removed, and simply constructed and compact for easy storage when not in use.

It is another object of this invention to provide a wheel chock assembly for tandem wheels wherein the chocks are held against the wheels by a force located directly between the chocks and the wheels.

It is another object of this invention to provide such a chock assembly wherein the chocks are held against the wheels by a force that is balanced by the resultant forces created between the chocks and the wheels and the wheel supporting surfaces.

It is a further object of this invention to provide a wheel chock assembly for tandem wheels that can be used with wheels of various diameters.

It is yet another object of this invention to provide a wheel chock assembly for tandem wheels that uses hollow cylindrical members for chocks, which can be used with wheels of varying diameters, and which can be nested together by providing one with a larger internal diameter than the outside diameter of the other, thereby facilitating storage of the chocks when not in use.

These and other objects, advantages, and features of this invention will be apparent to those skilled in the art from a consideration of this specification and attached drawings.

The invention will now be described in connection with the attached drawings in which, FIGURE 1 is a side view of the preferred embodiment of the wheel chock assembly of this invention in position between two tandem wheels to hold them against rolling in either direction;

FIGURE 2 is an exploded view of the wheel chock assembly of FIGURE 1; and

FIGURE 3 is a view of the parts of the wheel chock assembly of FIGURES 1 and 2 assembled for storage.

In FIGURE 1, wheel chock assembly 10 is shown in position between tandem wheels 11 and 12 to hold the wheels from rolling in either direction. The assembly includes two chocks, 13 and 14, each of which is wedged between one of the tandem wheels and the surface 15 that supports the wheels. Thus, the chocks have wheel engaging surfaces 13a and 14a respectively, and surfaces 13b and 14b, respectively, that engage the surface that supports the wheels. In the embodiment shown, the chocks are hollow, cylindrical members, which in use are positioned with their longitudinal axes parallel and spaced apart to provide facing, opposite, side surfaces 13c and 14c.

The chocks are made from a relatively rigid material, such as steel or aluminum. Being hollow cylindrical members, they can be sections cut from a joint of steel or aluminum pipe. Preferably, the inside diameter of one chock, for example, chock 13, is made larger than the outside diameter of chock 14, to permit the chocks to be nested, as shown in FIGURE 3, for storage purposes.

Means are located between the opposing sides of the chocks to exert a balanced separating force thereon to hold the wheel engaging surfaces of the chocks in engagement with the wheels with substantially uniformly distributed pressure. Means are also provided for moving the chocks apart.

In the embodiment shown, an elongated rigid member, comprising bolt 16, is located between the chocks and the wheels with its longitudinal axis transverse the longitudinal axes of the chocks. Means are provided to hold head 16a of the bolt in engagement with side surface 13c. Curved or U-shaped strap 17 is attached to side 13c, as by welding. The strap has a slot 17a which is wide enough to allow the stem of bolt 16 to pass therethrough, but not head 16a. The distance between the ends of the strap should be such that the flat sides of head 16a will engage the strap and be held against rotation, when the head of the bolt is positioned therein.

Means are provided on chock 14 to slidably support end 16b of the bolt for axial movement. In the embodiment shown, sleeve 18 is mounted in opening 19 provided in side surface 14c of chock 14 to slidably receive end 16b of the bolt. The sleeve extends laterally across the inside of the chock and is attached thereto, as by welding. Wing nut 20 is mounted on the bolt to engage the end of sleeve 18 and cause axial movement of the bolt relative to the sleeve.

To install the chock assembly between tandem wheels to hold them from rolling in either direction, the bolt is located with its head in strap 17 and the threaded end 16b in sleeve 18. Wing nut 20 is rotated to move it axially toward the head far enough to allow the bolt and sleeve to telescope sufficiently for the chocks to be placed between the wheels. When in place, by rotating wing nut 20, the bolt will be moved axially out of the sleeve and the chocks will be moved apart and into wedging position between the wheels and the surface upon which the wheels are supported, as shown in FIGURE 1.

Thus, the chocks are securely anchored in position between the wheels to hold them against rolling. Being cylindrical the chocks will engage and function to hold tandem wheels from rolling in either direction, even though their diameters may vary. The point of contact between the chocks and the wheels will vary, of course, but will always be near topmost parts of the chocks, so as to offer maximum resistance to starting of rolling of the wheel up onto the chock.

With the assembly in position, as shown in FIGURE 1, the connection between elongated member 16 and the chocks will be sufficiently rigid that any tendency to rotate, which may be imparted to either chock by one of the wheels tending to roll will be effectively resisted by the other chock since they are connected together through the elongated member. It is another feature of the invention that the force imposed on the chocks by the bolt and wing nut assembly lie in the same plane as the resultant forces produced on the chock by the wheels and the wheel supporting surface. Therefore, a balanced force system results with no force couple being imposed on the chocks.

For storage purposes, as shown in FIGURE 3, chock 14 is nested inside of chock 13 with the bolt and wing nut assembly placed inside of chock 14. Thus, the chock assembly forms a very compact package for storage purposes.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A chock assembly for placing between two tandem wheels to hold the wheels from rolling in either direction, comprising two cylindrical chocks for positioning, between tandem wheels, with their longitudinal axes parallel, said chocks, when so positioned, having their side surfaces in line contact with the ground for sliding along the ground into engagement with tandem wheels with at least a portion of the side surface of each chock making substantially line contact with one wheel, and means extending between the chocks to move the chocks apart into line contact with the wheels and to exert a balanced separating force thereon along a line that intersects the line of contact between the chocks and the wheels approximately midway of its ends to hold the chocks in engagement with tandem wheels, said moving and holding means including means secured to the chocks for holding the chocks from rotating around their longitudinal axes as they are moved apart into engagement with the wheels by said means.

2. The chock assembly of claim 1 in which said moving and holding means includes an elongated rigid member extending between the chocks, means on one of said chocks to releasably attach one end of the member in fixed position relative to the chock, means on the other chock for supporting the other end of the member for axial movement relative to the chock, and means located between the chocks for moving the member axially on said support means.

3. The chock assembly of claim 2 in which said means on one chock for slidably supporting said member for axial movement comprises a sleeve attached to the chock with the longitudinal axis of the sleeve parallel to the longitudinal axis of the elongated member.

4. The chock assembly of claim 3 in which the chock to which the sleeve is attached is provided with an opening in the side thereof that faces the other chock and said sleeve is mounted in said opening.

5. The chock assembly of claim 1 in which said moving and holding means includes a bolt having a flat sided head and a threaded end, a slotted pocket on one chock to receive the head and hold it against rotation, a sleeve attached to the other chock to receive the threaded end and support it for axial movement, and a nut on the threaded section of the bolt to engage the end of the sleeve whereby rotation of the nut in one sense will move the bolt axially out of the sleeve and the chocks apart.

References Cited by the Examiner

UNITED STATES PATENTS

| 2,011,469 | 8/1935 | Brueggenmann | 188—32 |
| 2,189,323 | 2/1940 | Noonan | 188—32 |
| 2,720,285 | 10/1955 | Taylor | 188—32 |
| 2,773,564 | 12/1956 | Garard | 188—32 |
| 2,818,940 | 1/1958 | Boyle | 188—32 |
| 3,189,127 | 6/1965 | Karnow et al. | 188—32 |

FOREIGN PATENTS 479,363  7/1929  Germany.

MILTON BUCHLER, *Primary Examiner.*

B. S. MOWRY, T. W. BUCKMAN,
*Assistant Examiners.*